United States Patent
Ammon et al.

(10) Patent No.: US 9,694,812 B2
(45) Date of Patent: Jul. 4, 2017

(54) METHOD FOR DETERMINING A TARGET CURVE INCLINE OF A MOTOR VEHICLE DURING TRAVELING OF A CURVED ROADWAY SECTION

(71) Applicant: Daimler AG, Stuttgart (DE)

(72) Inventors: Dieter Ammon, Remseck (DE); Claus-Michael Hainbuch, Weinstadt (DE); Magnus Rau, Kirchheim unter Teck (DE)

(73) Assignee: Daimler AG, Stuttgart (DE)

( * ) Notice: Subject to any disclaimer, the term of this patent is extended or adjusted under 35 U.S.C. 154(b) by 21 days.

(21) Appl. No.: 14/654,427

(22) PCT Filed: Oct. 31, 2013

(86) PCT No.: PCT/EP2013/003287
§ 371 (c)(1),
(2) Date: Jun. 19, 2015

(87) PCT Pub. No.: WO2014/094934
PCT Pub. Date: Jun. 26, 2014

(65) Prior Publication Data
US 2015/0336585 A1    Nov. 26, 2015

(30) Foreign Application Priority Data
Dec. 20, 2012 (DE) .......... 10 2012 024 970

(51) Int. Cl.
*B60W 40/072* (2012.01)
*B60W 30/04* (2006.01)
(Continued)

(52) U.S. Cl.
CPC ....... *B60W 30/025* (2013.01); *B60T 8/17551* (2013.01); *B60T 8/17554* (2013.01);
(Continued)

(58) Field of Classification Search
CPC ............... B60W 40/072; B60W 30/04; B60W 2550/146; B60W 2550/402;
(Continued)

(56) References Cited

U.S. PATENT DOCUMENTS 5,539,397 A * 7/1996 Asanuma ............... G01C 21/30
340/437
5,710,565 A * 1/1998 Shirai ................ B60K 31/0008
340/903
(Continued)

FOREIGN PATENT DOCUMENTS

CN    101357636 A    2/2009
CN    102632886 A    8/2012
(Continued)

OTHER PUBLICATIONS

PCT/EP2013/003287, International Search Report (PCT/ISA/210) dated Jan. 27, 2014 (Two (2) pages).

*Primary Examiner* — Tuan C. To
(74) *Attorney, Agent, or Firm* — Crowell & Morning LLP

(57) ABSTRACT

A method and device for determining a target curve incline of a motor vehicle during traveling of a curved roadway section is disclosed. A momentary transverse acceleration of the motor vehicle is determined depending on a momentary speed of the motor vehicle and a momentary roadway curvature of the curved roadway section determined by an optical detection system. A momentary target curve incline for the motor vehicle is calculated from the determined momentary transverse acceleration. A modified momentary target curve incline is calculated by weighting of the calculated target curve incline with a speed-dependent target curve incline weighting factor. The momentary roadway curvature is determined by additionally using a vehicle navigation system of the motor vehicle.

3 Claims, 2 Drawing Sheets

(51) Int. Cl.
*G01C 21/26* (2006.01)
*B60W 30/02* (2012.01)
*B60T 8/1755* (2006.01)

(52) U.S. Cl.
CPC ......... *B60T 8/17555* (2013.01); *B60W 30/04* (2013.01); *B60W 40/072* (2013.01); *G01C 21/26* (2013.01); *B60T 2210/24* (2013.01); *B60T 2210/36* (2013.01); *B60T 2230/06* (2013.01); *B60W 2030/043* (2013.01); *B60W 2520/10* (2013.01); *B60W 2520/105* (2013.01); *B60W 2550/146* (2013.01); *B60W 2550/402* (2013.01); *B60W 2720/18* (2013.01)

(58) Field of Classification Search
CPC ............. B60W 2520/105; G01C 21/26; B60T 8/17551; B60T 8/17554; B60T 8/17555; B60T 2210/24
See application file for complete search history.

(56) References Cited

U.S. PATENT DOCUMENTS

| | | | | |
|---|---|---|---|---|
| 5,978,731 A * | 11/1999 | Matsuda | ............ | B60K 31/0058 180/179 |
| 6,897,892 B2 * | 5/2005 | Kormos | ............... | G01C 21/365 348/148 |
| 7,509,214 B2 * | 3/2009 | Nagel | .................. | B60W 30/09 701/507 |
| 7,522,091 B2 * | 4/2009 | Cong | ................. | B60K 31/0008 342/107 |
| 2003/0070851 A1 * | 4/2003 | Winner | .............. | B60K 31/0008 180/167 |
| 2005/0225477 A1 * | 10/2005 | Cong | ................. | B60K 31/0008 342/70 |
| 2005/0251335 A1 * | 11/2005 | Ibrahim | ................ | G01C 21/30 701/469 |
| 2008/0183419 A1 * | 7/2008 | Cong | ................. | B60K 31/0008 702/155 |
| 2009/0037062 A1 | 2/2009 | Lee et al. | | |
| 2011/0270466 A1 * | 11/2011 | Nakadori | ............ | B60W 40/072 701/1 |
| 2012/0062747 A1 * | 3/2012 | Zeng | ..................... | B60W 40/06 348/149 |
| 2012/0271539 A1 * | 10/2012 | Bald | ................. | B60W 50/0097 701/300 |
| 2013/0041545 A1 | 2/2013 | Bar et al. | | |
| 2013/0063595 A1 * | 3/2013 | Niem | .................... | B62D 15/025 348/148 |
| 2013/0110386 A1 * | 5/2013 | Jin | ........................ | B60W 40/06 701/119 |
| 2015/0088455 A1 * | 3/2015 | Yamashita | ............... | G01C 9/08 702/155 |
| 2016/0001783 A1 * | 1/2016 | Ammon | ................ | B60W 40/06 701/1 |

FOREIGN PATENT DOCUMENTS

| | | |
|---|---|---|
| DE | 197 38 608 C1 | 7/1998 |
| DE | 10 2006 018 978 A1 | 11/2007 |
| DE | 10 2010 046 317 A1 | 3/2012 |
| EP | 2 322 903 A1 | 5/2011 |

* cited by examiner

METHOD FOR DETERMINING A TARGET CURVE INCLINE OF A MOTOR VEHICLE DURING TRAVELING OF A CURVED ROADWAY SECTION

BACKGROUND AND SUMMARY OF THE INVENTION

The present invention relates to a method for determining a target curve incline of a motor vehicle during travelling of a curved roadway section, as well as a device to determine a curved incline of a motor vehicle during travelling of a curved roadway section. The invention furthermore relates to a motor vehicle having such a device.

Electro-hydraulically active chassis systems are known by the term "Active Body Control (ABC)", which, besides a conventional spring and dampener function, also allow the possibility of the targeted setting of pitch and roll angles. A roll is therein referred to as a rotational movement of a motor vehicle around its longitudinal axis. Such a roll movement can result during travelling of a curved roadway section by the motor vehicle if the motor vehicle inclines outwards around a determined roll angle due to the occurring centrifugal forces. The roll angle set here depends on the transverse acceleration of the motor vehicle, the center of gravity height, the chassis construction of the motor vehicle as well as the speed thereof.

The centrifugal forces occurring during travelling of the curved roadway section are often uncomfortable to experience for the passengers of the motor vehicle and can therefore lead to a considerable reduction of the driving comfort. A possibility to reduce the comfort-reducing effect of such undesired transverse forces on the passenger of the motor vehicle consists in implementing incline technology in the motor vehicle by means of "Active Body Control (ABC)", as has already been used for a long time in rail vehicles. By using such incline technology, it is possible for the motor or rail vehicle not to incline outwards during travelling of a curved roadway or rail section, but rather in the opposite direction, so inwards, due to corresponding control of a chassis of the motor vehicle. For this purpose, the chassis can be provided with suitable actuators, for example in the manner of height-adjustable struts which connect the vehicle frame to each wheel of the motor vehicle in a height-adjustable manner, such that a determined roll angle of the motor vehicle can be set.

As the centrifugal forces occurring during travelling of the curved roadway section depend on different factors, such as for example a roadway curvature of the roadway section or the momentary speed, the roll angle to be set in the sense of incline technology on the chassis of the motor vehicle must also be determined depending on these parameters in order to ensure as high a level of driving comfort as possible for the passengers.

DE 10 2010 046 317 A1 describes a method to set the spatial position of a roll axis around which the motor vehicle is able to rotate at a predetermined roll angle. According to the method, firstly in a first step, a spatial target position of the position of the roll axis is set and subsequently in a second step, a transverse acceleration of the motor vehicle is determined. In a third step, a target cross slope of the motor vehicle and target transverse offset of the motor vehicle is finally determined depending on the transverse acceleration, such that when setting the target cross slope and the target transverse offset, a transfer of the roll axis into the target position is caused. In order to ensure that the motor vehicle occupies the target cross slope determined in the previous step, at least one actuator of an active chassis device of the motor vehicle is adjusted accordingly. Additionally, at least one actuator to influence the transverse movement of the motor vehicle is adjusted in such a way that the motor vehicle additionally also occupies the target transverse offset determined in the previous step. The expected transverse acceleration can, for example, be determined with the aid of a camera system attached to the motor vehicle, which optically detects the curved roadway section in front of the motor vehicle which is to be travelled and analyses it to determine the expected transverse acceleration.

DE 10 2006 018 978 A1 describes a method for determining a roll angle of a motor vehicle having at least one device to determine the yaw rate or a value correlated thereto as well as a device for determining the vehicle speed and a camera system which is possibly directed forwards. The roll angle is determined by using the yaw rate or a value correlated thereto and the specific roll spring stiffness of the vehicle.

It is the object of the present invention to specify an improved embodiment for a method for determining a target curve incline (=roll angle) of a motor vehicle during travelling of a curved roadway section as well as a device for determining this target curve incline.

The invention is based on the general idea to calculate the target curve incline to be determined based on a momentary roadway curvature determined by means of an optical detection system, wherein the determination of the momentary roadway curvature additionally occurs by using a vehicle navigation system of the motor vehicle. For this purpose, the information with regard to the roadway curvature of the respective roadway section contained in the map data can be gleaned.

In addition to the sensor output data provided by the optical detection system, map data of the vehicle navigation system can therefore be used for the calculation of the roadway curvature. A great advantage of the use of such map data consists in that the roadway curvature can be determined not only during travelling of a determined roadway section, but can be determined by corresponding reading of the map data for any roadway section of the map data stored in the vehicle navigation system. Additionally, such map data often contains further map information such as, for example, a longitudinal incline and—if present—also a cross slope of the roadway section. As the map data of the vehicle navigation system is alone not sufficient for the determination of the roadway curvature in a practical operation of the motor vehicle (as the map data, for example, can be outdated due to constructional changes of the course of the road), the determination of the momentary roadway curvature using the vehicle navigation system occurs, according to the invention, only as a support for the actual determination of the roadway curvature by means of the optical detection system which, for example, can be a camera system which provides an image of what is in front of the motor vehicle as sensor output data.

In this context, it is particularly conceivable that the momentary roadway curvature determined by means of the vehicle navigation system is used for verification of the roadway curvature determined by means of the optical detection system. It can also be conceived that, with the aid of the vehicle navigation system, values of the momentary roadway curvature which are determined by means of the optical detection system and which contain errors can be corrected.

Due to the extraction of the roadway curvature from the map data of the vehicle navigation system according to the invention, it is therefore possible to filter out different types of disturbances such as a road displacement or a determined steering behavior of the driver of the motor vehicle from the sensor signals of the optical detection system.

From the momentary roadway curvature determined by means of the optical detection system in connection with the vehicle navigation system, a momentary transverse acceleration of the motor vehicle can be determined by means of the method according to the invention and from this, the desired target curve incline can be determined, wherein this is weighted with a speed-dependent weighting factor. Thus, by means of the method according to the invention, an optimum target curve incline (=roll angle) for the travelling of a curved roadway section can be determined, which, if it is set by means of an adjustable chassis of the motor vehicle, leads to improved driving comfort for the passengers of the motor vehicle. By means of the weighting of the momentary target curve incline with a speed-dependent weighting factor, an optimized roll angle of the motor vehicle which is set in the chassis can be determined for the travelling of the curved roadway section, for which transverse forces acting on the vehicle passengers can be decreased particularly well or even can be almost completely eliminated, such that the driving comfort for the passengers of the motor vehicle can be clearly increased. Fundamentally, in the case of the application of the method according to the invention in a motor vehicle, the momentary transverse acceleration and the sought-after target curve incline derived therefrom can be determined for the motor vehicle with particularly high operational security.

In the method according to the invention, in a first step a), a momentary transverse acceleration of the motor vehicle can be determined depending on a momentary speed of the motor vehicle from a momentary roadway curvature of a curved roadway section determined by means of an optical detection system, wherein the determination of the momentary roadway curvature occurs according to step a) by using a vehicle navigation system of the motor vehicle.

In a second step b), a momentary target curve incline for the motor vehicle is determined from the momentary transverse acceleration calculated in step a). In a third step c), a modified momentary target curve incline is finally calculated by weighting the target curve incline calculated in step b) with a speed-dependent target curve incline weighting factor. Based on the modified target curve incline calculated in step c), a chassis of the motor vehicle can be controlled in such a way that the motor vehicle assumes the roll angle defined by the modified target curve incline relative to the road surface of the curved roadway section to be travelled. For this purpose, the chassis device can, for example, be provided with suitable height-adjustable actuators in the manner of struts.

In a preferred embodiment, the determination of the roadway curvature can occur by means of the vehicle navigation system by extraction of the roadway curvature from the map data of the vehicle navigation system allocated to the roadway section being travelled, wherein the allocation occurs by using a momentary position of the motor vehicle provided by a position sensor of the vehicle navigation system. In the course of such an extraction, the roadway curvature extracted from the map data is compared with the momentary roadway curvature determined by means of the optical detection system. It is also conceivable to use the momentary roadway curvature determined by means of the vehicle navigation system to verify the momentary roadway curvature determined by means of the optical detection system.

In a developing or alternative embodiment, a non-optical sensor system can be used in combination with the optical sensor system or, alternatively to this, to determine the momentary transverse acceleration. In the case of the use of a non-optical sensor system in combination with the optical detection system, the momentary roadway curvature determined by means of the vehicle navigation system can be used as explained above for supporting determination of the momentary roadway curvature by means of the optical detection system.

In the case that the momentary transverse acceleration of the motor vehicle is not determined by means of an optical detection system, however, the momentary transverse acceleration can be determined by means of the vehicle navigation system (by determination of the momentary roadway curvature instead of the determination by means of the optical detection system) in order to verify the momentary transverse acceleration determined by means of the non-optical sensor system. Thus the non-optical sensor system can, on the one hand, be used synergistically with the optical detection system or alternatively to this, and in both cases, the vehicle navigation system can be used for verification purposes. In this way, the momentary transverse acceleration can be determined particularly accurately.

Preferably, the non-optical sensor system comprises an acceleration sensor, in particular a g-sensor, which provides a momentary sensor transverse acceleration value as sensor output data.

Alternatively or additionally, the non-optical sensor system can comprise, in a particularly preferred embodiment, a yaw rate sensor, which provides a momentary yaw speed as sensor output data. The sensor output data present in the form of a momentary yaw speed can optionally be additionally filtered by means of a phase filter or/and a low-pass filter in order to be able to correct undesired disturbances in the sensor output data, for example due to unevenness in the surface of the roadway of the roadway to be travelled, among other things.

In a likewise preferred embodiment, the non-optical sensor system can comprise a steering wheel angle sensor or/and a wheel angle sensor which provides a momentary steering wheel angle or wheel angle of the steering wheel or of the wheels of the motor vehicle as sensor output data. For the determination of the momentary transverse acceleration from the steering wheel angle or wheel angle, for example, a simple one-track model can be used for the mathematical calculation. In more complex models allowing developed, more precise calculation results, the steering behavior or/and the tire running behavior of the motor vehicle can be included such that, in the case of such an overall consideration, the instructions of a driver of the motor vehicle can be particularly quickly and effectively implemented in the roll angle setting.

By means of the use of different types of sensor types in the non-optical sensor system (acceleration sensor, yaw rate sensor, steering wheel angle sensor, wheel angle sensor) to determine the momentary transverse acceleration, the sought-after target curve incline can be determined in an effective manner, independently of the actual lane information.

In developing embodiments, depending on different internal and external parameters, for example predetermined operational or/and error states of the non-optical sensor system or/and of the optical detection system, it can be also set in which manner the momentary roadway curvature or/and the momentary transverse acceleration are determined and whether the non-optical sensor system or/and the optical detection system is to be used here in combination with the vehicle navigation system or not.

According to the invention, to determine the momentary transverse acceleration, therefore, several of the sensor types referred to above of the non-optical sensor system combine with one another and are used together with the vehicle navigation system. The method according to the invention therefore offers, in terms of accuracy and operational reliability, a maximum level of flexibility for the determination of the momentary transverse acceleration and thus also for the calculation following this of the target curve incline of the motor vehicle.

The invention also relates to a device for the determination of a target curve incline of a motor vehicle during travelling of a curved roadway section. The device comprises an optical detection system by means of which a momentary roadway curvature of a momentary curved roadway section travelled by the motor vehicle is able to be determined. The device furthermore comprises a vehicle navigation system which comprises a data store having map data and a position sensor, and by means of which a momentary position of the motor vehicle is able to be determined. According to the invention, the control device determines the momentary roadway curvature of the curved roadway section by means of the optical detection system and in combination with the vehicle navigation system and from this a momentary target curve incline for the motor vehicle. From the momentary target curve incline, a modified target curve incline is calculated by weighting with a target curve incline weighting factor.

The invention furthermore relates to a motor vehicle having a device having the features referred to above as well as having a chassis device which is able to be controlled by the control device of this device, by means of which the modified target curve incline determined by the control device is able to be set in the motor vehicle.

Further important features and advantages of the invention result from the sub-claims, from the drawings and from the relevant description of the figures, by means of the drawings.

It is understood that the features referred to above and still to be explained below are not only able to be used in the respectively specified combination, but also in other combinations or alone, without leaving the scope of the present invention.

Preferred exemplary embodiments of the invention are depicted in the drawings and are explained in more detail in the following description, wherein the same reference numerals refer to the same or similar or functionally identical components.

BRIEF DESCRIPTION OF THE DRAWINGS

FIG. 2 is a motor vehicle having a device according to the invention to set the curve incline of a motor vehicle, wherein FIG. 2a shows a top view and FIG. 2b shows a back view of the motor vehicle.

DETAILED DESCRIPTION OF THE DRAWINGS

Figure 1:
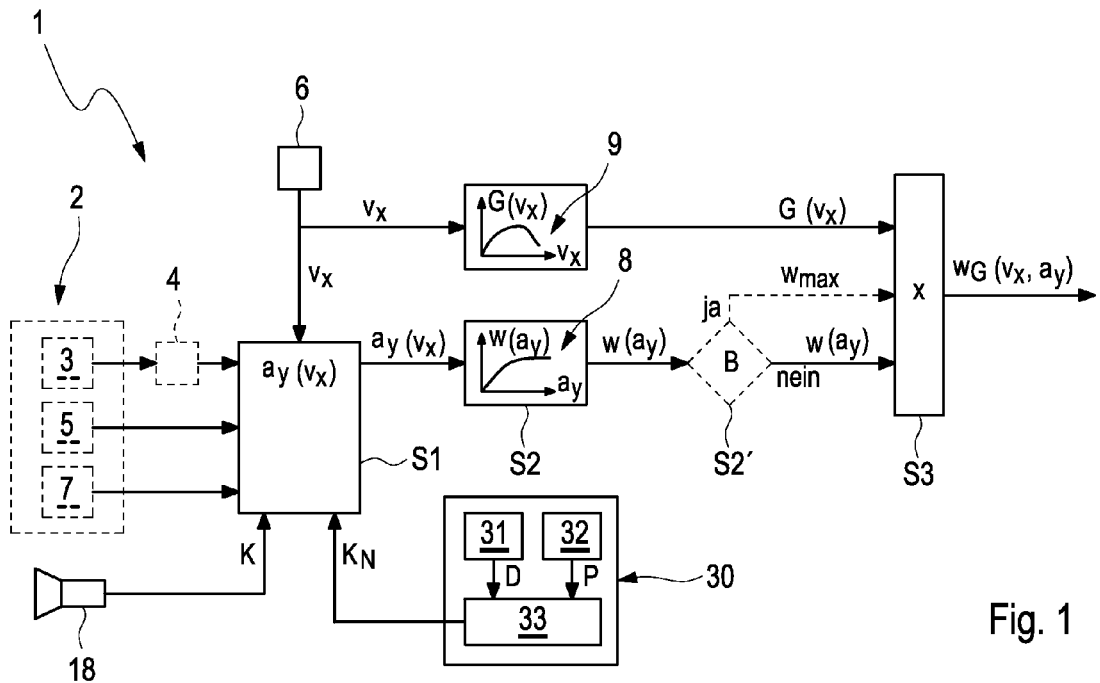
FIG. 1 is a roughly schematic flow diagram of the method according to the invention.
Figure 2A:
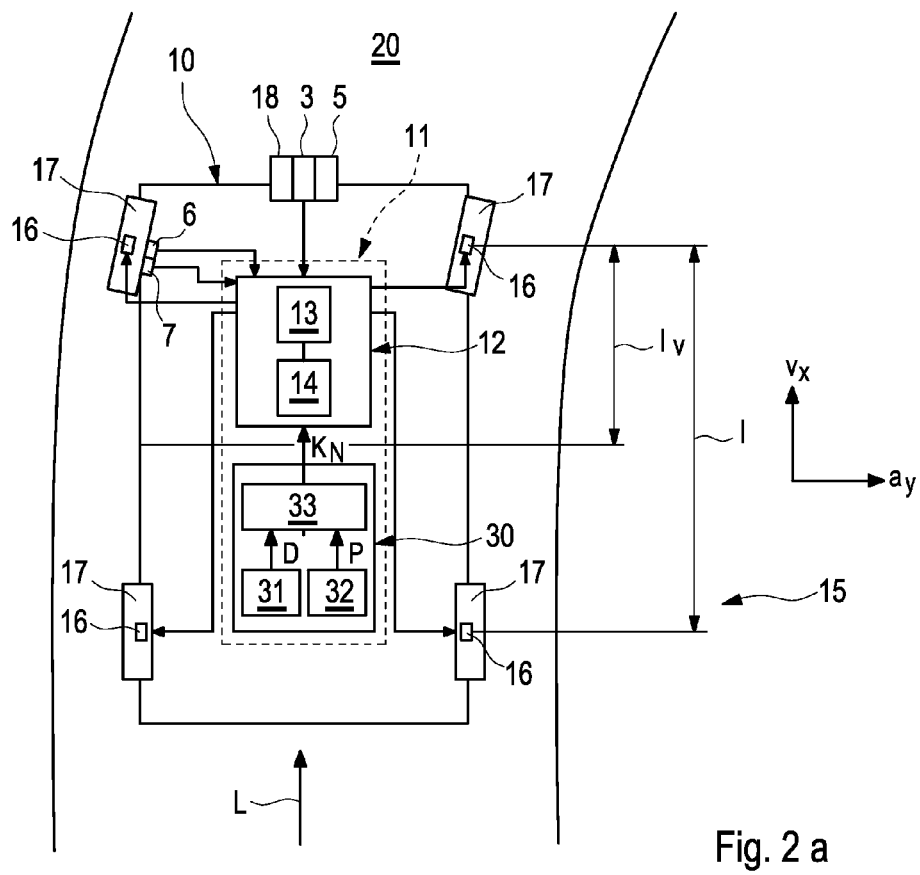
Figure 2:
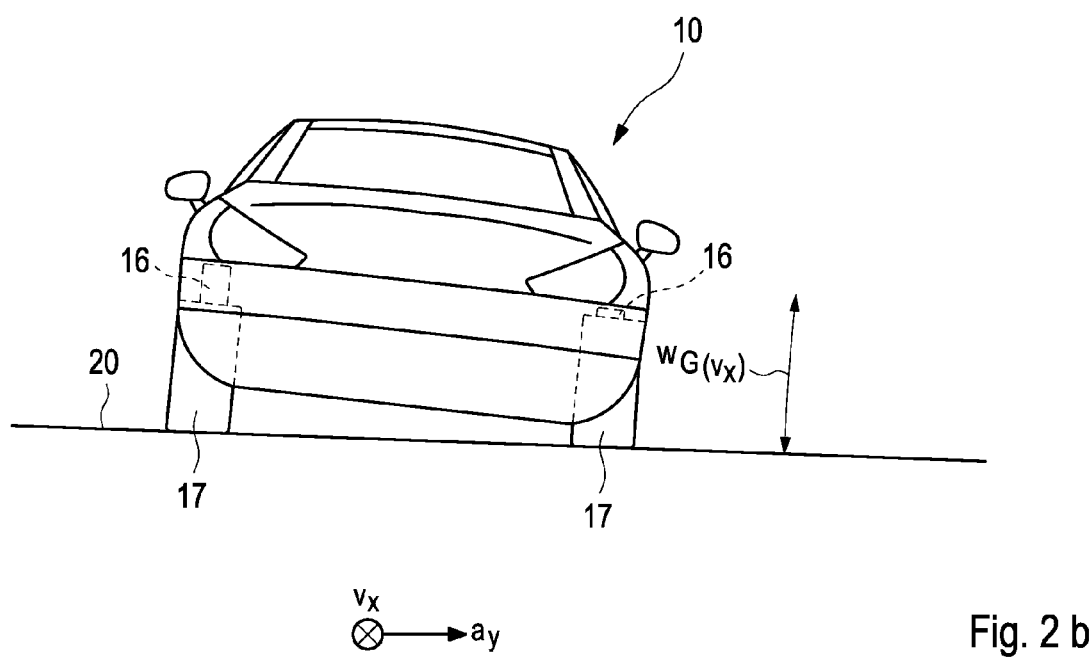

In FIG. 1, a flow diagram of the method according to the invention is depicted roughly schematically and referred to with 1. FIG. 2 shows a motor vehicle 10 having a control device 12 to implement the method according to the invention during travelling of a curved roadway section 20. FIG. 2a shows the motor vehicle 10 roughly schematically in a top view; FIG. 2b shows a rear view.

In a first step S1, a momentary transverse acceleration ay of the motor vehicle 10 is calculated from a momentary roadway curvature K of the curved roadway section 20 determined by means of an optical detection system 18, depending on a momentary speed $v_x$ of the motor vehicle 10. The optical detection system 18 can, for this purpose, comprise a camera system, with which an area in front of the vehicle of a motor vehicle 10 using the optical detection system 18 is monitored.

According to the invention, the determination of the momentary roadway curvature K occurs according to step S1 using a vehicle navigation system 30. The vehicle navigation system 30 can have a navigation system control unit 33 in the manner of a conventional microcontroller. The determination of the roadway curvature K occurs by evaluation of the map data D of the vehicle navigation system 30 allocated to the roadway section 20 being travelled, by the navigation system control unit 33, wherein the map data D can be deposited in a data store 31 of the vehicle navigation system 30. The allocation of the map data D to the curved roadway section 20 travelled momentarily by the motor vehicle 10 occurs with the aid of a position sensor 32 of the vehicle navigation system 30 which emits a momentary position P of the motor vehicle 10 to the navigation system control unit 33.

In addition to the sensor output data provided by the optical detection system 18, according to the invention, for the calculation of the roadway curvature K, map data D of the vehicle navigation system 30 is therefore used and the roadway curvature $K_N$ is extracted from this. A great advantage of the use of such map data consists in that the roadway curvature $K_N$ can be determined not only during travelling of a determined roadway section, but can be determined by corresponding reading of the map data for any roadway section of the map data D stored in the vehicle navigation system 30. Additionally, such map data D often also contains, if necessary, further map information such as, for example, a longitudinal slope and—if present—also a cross slope of the respective roadway section 20. As the map data D of the vehicle navigation system 30 is not sufficient alone for the determination of the roadway curvature K in a practical operation of the motor vehicle 10, as the map data, for example can be outdated due to constructional changes of the course of the roadway, the determination of the momentary roadway curvature K occurs using of the vehicle navigation system 30 according to the invention only to support an actual determination of the roadway curvature K by means of the optical detection system 18. For example, the desired momentary roadway curvature $K_N$ of the roadway section 20 that is being travelled can be extracted from the map data D and can be compared to the momentary roadway curvature K determined by means of the optical detection system 18. It is also conceivable to use the momentary roadway curvature $K_N$ determined by means of the vehicle navigation system to verify the momentary roadway curvature K determined by means of the optical detection system 18. In particular it can be conceived that values of the momentary roadway curvature K which are determined by the vehicle navigation system 30 by means of the optical detection system 18 and which contain errors, can be corrected. Such a value which contains errors can, for example, be caused by intense radiation from the sun on an optical sensor of the optical detection system 18. The momentary transverse acceleration ay of the motor vehicle 10 can then be calculated from the momentary roadway curvature K determined by the optical detection system 18 in connection with the vehicle navigation system 30 and a momentary speed $v_x$ of the motor vehicle 10 via the equation $a_y = K \cdot v_x^2$. The momentary speed $v_x$ can, for this purpose, be determined by means of a speed sensor 6 installed in the motor vehicle 10.

The determination of the momentary transverse acceleration ay according to step S1 can occur, in a variant of the exemplary embodiment described below, not only by means of the optical detection system 18, but alternatively or additionally also by means of a non-optical sensor system 2. In the first case, the momentary roadway curvature $K_N$ is determined exclusively by means of the vehicle navigation system 30 (as no optical detection system is available). With regard to the equation $ay = K_N \cdot v_x^2$, the momentary transverse acceleration ay of the motor vehicle 10 can be calculated and this value for the momentary transverse acceleration ay can be compared with a value determined by means of the non-optical sensor system 2 for the momentary transverse acceleration ay.

The non-optical sensor system 2 can comprise, for example, one acceleration sensor 3 for the determination of the momentary transverse acceleration ay, which provides a momentary sensor transverse acceleration value as sensor output data. The sensor output data can be filtered by means of a suitable low-pass filter 4 in order to filter out high-frequency disturbances (for example due to unevenness in the roadway section being travelled) in the sensor output data provided by the acceleration sensor 3. Advantageously, such an acceleration sensor 3 is arranged in the motor vehicle as far as possible to the front of the motor vehicle with regard to a vehicle longitudinal direction L of the motor vehicle 10 (cf. FIG. 2a).

Alternatively or additionally to the acceleration sensor 3, the non-optical sensor system 2 also comprises a yaw rate sensor 5 which provides a momentary yaw speed $d/dt\,\psi$ as sensor output data, wherein $\psi$ is the momentary yaw angle. The calculation of the momentary transverse acceleration ay from the momentary yaw speed occurs according to the equation $ay = (d/dt\,\psi)\,v_x$, wherein ay is the momentary transverse acceleration, $d/dt\,\psi$ is the momentary yaw speed, and $v_x$ is the momentary speed of the motor vehicle. This means that, for the determination of the momentary transverse acceleration ay from the yaw rate $d/dt\,\psi$, knowledge of the momentary vehicle speed $v_x$ of the motor vehicle is also required. The momentary speed $v_x$ of the motor vehicle 10 can be determined for use in the method according to the invention by means of the speed sensor 6 integrated into the motor vehicle 10.

The momentary transverse acceleration ay, calculated from the yaw speed $d/dt\,\psi$, refers fundamentally to a center of gravity of the motor vehicle 10. The transverse acceleration $a_{y,\,VA}$ with regard to a front axis of the motor vehicle 10 can be calculated from this using the equation $a_{y,\,VA} = ay + l_v\,d/dt\,\psi$, wherein $l_v$ is the distance of the front transverse axis of the motor vehicle to the center of gravity of the motor vehicle 10 in a longitudinal direction of the motor vehicle 10. The momentary transverse acceleration $a_y$ calculated by means of the yaw speed determined by the yaw rate sensor is independent of a cross slope of the travelled roadway section 20.

Alternatively or additionally to the sensors explained above (acceleration sensor 3 and yaw rate sensor 5), the non-optical sensor system 2 can also comprise a steering wheel angle sensor and/or a wheel angle sensor 7, which then provide a momentary steering wheel angle or a momentary wheel angle $\delta$ as sensor output data. The momentary transverse acceleration ay can therein be calculated from the sensor output data provided by the steering wheel angle sensor or wheel angle sensor 7 using the so-called single track model by means of the equation $ay = v_x^2\,\delta/(1 + EG\,v_x^2)$. Here, $\delta$ is the steering wheel angle or wheel angle, l is the wheel position of the motor vehicle 10 and EG is the so-called self-steering gradient of the motor vehicle 10. Of course, instead of the single track model, more complex equations which consider a steering model or/and a tire running behavior of the motor vehicle 10 can alternatively also be used to calculate the momentary transverse acceleration ay from the steering wheel angle $\delta$ or wheel angle. The momentary speed $v_x$ of the motor vehicle can in turn be determined by means of the speed sensor 6 integrated into the motor vehicle 10.

Independently of which sensors the non-optical sensor system 2 actually has, in each case the momentary transverse acceleration ay can be calculated in an alternative manner by means of the vehicle navigation system 30 and can be used for verification purposes, among other things.

In a second step S2 of the method according to the invention, a momentary target curve incline $w(a_y)$ is now determined from the previously determined momentary transverse acceleration $a_y(v_x)$ depending on the momentary transverse acceleration ay of the motor vehicle. Such a functional dependency of the momentary target curve incline $w(a_y)$ of the momentary transverse acceleration ay can be set in the way of a characteristic diagram 8. Alternatively to this, however, an analytical connection between the momentary target curve incline $w(v_x)$ and the momentary transverse acceleration ay can also be defined.

In a third step S3 of the method according to the invention, a modified momentary target curve incline $wG\,(a_y,\,v_x)$ is calculated from the momentary target curve incline $w(a_y)$ calculated in step S2 by means of weighting with a speed-dependent weighting factor $G(v_x)$. For this purpose, the target curve incline weighting factor $G(v_x)$ is multiplied by the previously determined momentary target curve incline $w(a_y)$. The speed-dependent weighting factor $G(v_x)$ can be set using a predetermined functional dependency of the weighting factor G on the speed $v_x$ of the motor vehicle. Such a functional dependency can, for example, be defined in the way of a characteristic diagram 9; alternatively to this, however, an analytic connection between the speed-dependent weighting factor $G(v_x)$ and the speed $v_x$ can also be defined.

It is clear that the method according to the invention can be implemented iteratively in practical use in a motor vehicle such that, during travelling of a curved roadway section 20, the roll angle calculated by means of the method according to the invention can constantly be updated and thus can be adapted to changing roadway proportions or to changes of the momentary speed $v_x$ of the motor vehicle 10.

The method according to the invention can furthermore comprise an optional (represented by dotted lines in FIG. 1) method step S2', according to which it is set whether a predetermined external condition B is fulfilled, and, if this is the case, the momentary target curve incline $w(a_y)$ determined in step S2 is reduced to a predetermined maximum value $w_{max}$, if the momentary target curve incline $w(a_y)$ exceeds the predetermined maximum value $w_{max}$. Such an external condition B can, for example, be the operation of an indicator by a driver of the motor vehicle, if he intends to change lanes during travelling of the curved roadway section. Due to such temporary reduction of the momentary target curve incline $w(a_y)$ to a maximum value $w_{max}$, the curve incline of the motor vehicle 10 can additionally be reduced in order to make a change of lane as comfortable as possible for the passengers of the motor vehicle 10. After completion of such a change of lane, such a temporary reduction of the momentary target curve incline $w(a_y)$ to the predetermined maximum value $w_{max}$ can then be removed again. Of course, instead of the operation of the indicator explained above, other events are also considered as predetermined external conditions B. For example, in one variant it can be conceived that an optical detection system detects an intentional change of lane. In this case, the predetermined external condition B which must be fulfilled is not the operation of an indicator, but rather quite generally an intentional change of lane of the motor vehicle 10 detected by a suitable detection system.

In the depiction of FIG. 2, a motor vehicle 10 is shown having a device 11 according to the invention for determining a target curve incline during travelling of a curved roadway section 20. FIG. 2a shows the motor vehicle 10 therein in a top view; FIG. 2b shows it in a rear view.

The device 11 comprises a control device 12 as well as an optical detection system 18 by means of which a momentary roadway curvature K of a momentary curved roadway section 20 travelled by the motor vehicle 10 is able to be determined. The device 11 furthermore comprises a vehicle navigation system 30. The vehicle navigation system 30 can have a navigation system control unit 33 in the manner of a conventional microcontroller. The determination of the roadway curvature K occurs using the vehicle navigation system 30. For this purpose, the map data D of the vehicle navigation system 30 allocated to the roadway section 20 being travelled is evaluated by the navigation system control unit 33, and the roadway curvature $K_N$ is determined in this way.

The map data D can be deposited in a data store 31 of the vehicle navigation system 30. The allocation of the map data D to the momentary curved roadway section 20 travelled by the motor vehicle occurs with the aid of the position sensor 32 of the vehicle navigation system 30 which emits a momentary position P of the motor vehicle to the navigation system control unit 33. The position sensor 32 can be a conventional GPS receiver.

According to the invention, the control device 12 determines the momentary roadway curvature K of the curved roadway section 20 by means of the optical detection system 18 and in combination with the vehicle navigation system 30 and from this a momentary target curve incline $w(v_x)$ for the motor vehicle 10. For this purpose, the vehicle navigation system 30 can be connected for communication to the control device 12 and can transfer a momentary value for the determined roadway curvature K to the control device 12. Finally, a modified target curve incline $w_G(v_x)$ is calculated from the momentary target curve incline $w(v_x)$ by the control device 12 by weighting with a target curve incline weighting factor $G(v_x)$.

The device 11 can optionally have an acceleration sensor 3, a yaw rate sensor 5, a steering angle/wheel angle sensor 7 or/and a speed sensor 6, which are each connected for communication to the control device 12. The sensors form the non-optical sensor system 2. Therein, the acceleration sensor transmits the momentary sensor transverse acceleration ay, the steering angle/wheel angle sensor 7 transmits the momentary steering wheel angle or momentary wheel angle δ, and the yaw rate sensor 5 transmits the momentary yaw speed d/dt ψ to the control device 12. In simplified variants, one or two of the three sensors 3, 5, 7 referred to above can be dispensed with.

The control device 12 can comprise a control unit 13 (ECU) and a storage unit 14 which is connected for communication to the control unit 13. The control unit 13 and the storage unit 14 can be formed in the manner of a conventional microcontroller, wherein numerous technical implementation possibilities are known to the person skilled in the art. The control device 12 is also connected for communication to the speed sensor 6, which transmits the momentary speed $v_x$ of the motor vehicle 10 to the control device 12. The method according to the invention is implemented in the control device 12 using the input parameters referred to above (momentary speed of the motor vehicle $v_x$, yaw speed d/dt ψ or/and momentary steering wheel angle or momentary wheel angle δ or/and momentary sensor transverse acceleration $a_y^{Sensor}$). The characteristic diagrams 8 and 9 can be deposited in the storage unit 14 and can be read by the control unit 12 to implement method steps S2 and S3. In the case that the storage unit 14 is a writeable store, the characteristic diagrams 8 and 9 can be modified by overwriting the corresponding storage region in the storage unit 14, for example if individual characteristic diagrams are used for different types of motor vehicle. The momentary transverse acceleration $a_y(v_x)$ of the motor vehicle 10 is calculated by the control device 12 according to step S1 of the method according to the invention. The modified momentary target curve incline $w_G(v_x)$ is calculated from the momentary transverse acceleration $a_y(v_x)$ according to steps S2 and S3.

The motor vehicle 10 comprises a chassis device 15 which is able to be controlled by the control device 12, which can be formed in the manner of an electro-hydraulic active chassis. The chassis device 15 comprises four actuators 16 formed as height-adjustable struts, wherein an actuator 16 is allocated to each wheel 17 of the motor vehicle. The target curve incline $w_G$ (so the desired roll angle) determined by means of the method according to the invention can be set in the motor vehicle 10 by an individual adjustment of the height of the actuators 16.

Alternatively to the electro-hydraulic chassis device 15 described above, a pneumatic spring-based chassis can also be used having a closed pressure supply. In such a pneumatic spring-based chassis, to adjust the struts, the air is pumped into a closed circuit by an air cell in the pneumatic spring and reversed, which enables a very quick transfer in and out of the struts to set the target curve incline in the chassis of the motor vehicle.

In a further alternative to the electro-hydraulic active chassis, a chassis which is known by the term "ACTIVE CURVE SYSTEM" and which is hydraulically adjustable can be used, which works with an hydraulic pump driven by a belt drive and has an oil container in the motor chamber as well as a valve block and active stabilizer on each of the front and rear axles. Also, such an hydraulic chassis device can be used to set the target curve incline in the motor vehicle.

The invention claimed is:

1. A method for adjusting an incline of a motor vehicle chassis using a target curve incline of the motor vehicle determined during traveling of a curved roadway section, comprising the steps of:
   a) determining a momentary transverse acceleration of the motor vehicle depending on a momentary speed of the motor vehicle and a momentary roadway curvature of the curved roadway section, wherein the momentary roadway curvature is determined by an optical detection system and a vehicle navigation system of the motor vehicle;

b) calculating a momentary target curve incline for the motor vehicle from the momentary transverse acceleration determined in step a);

c) calculating a modified momentary target curve incline by weighting the momentary target curve incline calculated in step b) with a speed-dependent target curve incline weighting factor; and d) setting the chassis of the motor vehicle to said modified momentary target curve incline by individual adjustment of actuators respectively allocated to wheels of the motor vehicle.

2. The method according to claim 1, wherein the momentary roadway curvature is determined by additionally using the vehicle navigation system by extraction of a roadway curvature from map data of the vehicle navigation system allocated to the curved roadway section being traveled, wherein the allocation occurs by using a momentary position of the motor vehicle provided by a position sensor of the vehicle navigation system.

3. A device for adjusting an incline of a motor vehicle chassis using a target curve incline of the motor vehicle determined during traveling of a curved roadway section, comprising:

a control device;

an optical detection system, wherein a momentary roadway curvature of a curved roadway section traveled by the motor vehicle is determinable by the optical detection system;

a vehicle navigation system which includes a data store having map data and a position sensor, wherein a momentary position of the motor vehicle is determinable by the vehicle navigation system; and actuators respectively allocated to wheels of the motor vehicle;

wherein the control device:

determines the momentary roadway curvature of the curved roadway section by using the optical detection system in combination with the vehicle navigation system;

determines a momentary target curve incline for the motor vehicle from the momentary roadway curvature determined by the control device;

calculates a modified momentary target curve incline from the momentary target curve incline by weighting with a target curve incline weighting factor; and controls the actuators to set a chassis of the motor vehicle to said modified momentary target curve incline by individual adjustment of said actuators.

* * * * *